United States Patent
Li et al.

(10) Patent No.: US 7,761,424 B2
(45) Date of Patent: Jul. 20, 2010

(54) RECORDING NOTATIONS PER FILE OF CHANGED BLOCKS COHERENT WITH A DRAINING AGENT

(75) Inventors: Hong Li, Acton, MA (US); Christopher John Stakutis, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 11/463,735

(22) Filed: Aug. 10, 2006

(65) Prior Publication Data

US 2008/0040368 A1 Feb. 14, 2008

(51) Int. Cl.
*G06F 7/00* (2006.01)
*G06F 17/00* (2006.01)

(52) U.S. Cl. .................................................. 707/646
(58) Field of Classification Search ................ 707/102, 707/206; 714/15, 25
See application file for complete search history.

(56) References Cited

U.S. PATENT DOCUMENTS

| | | | | |
|---|---|---|---|---|
| 5,113,519 | A * | 5/1992 | Johnson et al. | 707/201 |
| 5,758,355 | A * | 5/1998 | Buchanan | 707/201 |
| 6,446,075 | B1 * | 9/2002 | Velasco | 707/102 |
| 6,484,186 | B1 | 11/2002 | Rungta | |
| 6,643,671 | B2 * | 11/2003 | Milillo et al. | 707/204 |
| 6,668,264 | B1 | 12/2003 | Patterson et al. | |
| 6,711,572 | B2 * | 3/2004 | Zakharov et al. | 707/10 |
| 6,748,504 | B2 | 6/2004 | Sawdon et al. | |
| 6,802,025 | B1 * | 10/2004 | Thomas et al. | 714/15 |
| 6,915,316 | B1 | 7/2005 | Patterson et al. | |
| 7,296,184 | B2 * | 11/2007 | Derks et al. | 714/25 |
| 2003/0182330 | A1 | 9/2003 | Manley et al. | |
| 2004/0054987 | A1 | 3/2004 | Sonpar et al. | |
| 2005/0216889 | A1 | 9/2005 | Sandwith | |
| 2005/0227683 | A1 | 10/2005 | Draluk et al. | |

OTHER PUBLICATIONS

Non-U.S. Search Report from China IP Law regarding Information Disclosure Statement, dated Apr. 10, 2009, 1 pp.

* cited by examiner

*Primary Examiner*—Greta L Robinson
*Assistant Examiner*—Jeffrey Chang
(74) *Attorney, Agent, or Firm*—Janaki K. Davda; Konrad Raynes and Victor LLP

(57) ABSTRACT

Provided are techniques for transferring data. It is determined whether an indicators map is to be associated with a source file that is being opened, wherein the indicators map indicates which source blocks of the source file have been updated since last being transferred to a target file. In response to determining that an indicators map is to be associated with the source file, it is determined whether the indicators map exists. In response to determining that the indicators map exists, it is determined whether the indicators map is to be trusted based on a last modified time and a last source file size stored in the indicators map and the source file. In response to determining that the indicators map is to be trusted, the indicators map is initialized. Then, in response to receiving a write for the source file, the indicators map is updated to indicate which portion of the source file has been modified.

21 Claims, 6 Drawing Sheets

RECORDING NOTATIONS PER FILE OF CHANGED BLOCKS COHERENT WITH A DRAINING AGENT

BACKGROUND

1. Field

Embodiments of the invention relate to simultaneous download to multiple targets.

2. Description of the Related Art

A challenge in any data protection or replication solution is network bandwidth usage, particularly with very large files and particularly when going to Wide Area Network (WAN) speed target locations. It is not practical to transmit the entirety of a multi-gigabyte file when only some sub-portion of the file has changed since a prior transfer.

There are a variety of techniques for optimizing the amount of data transferred in a replication solution. A replication solution may be described as providing backup and protection of data. Known techniques have various drawbacks or complications. Of particular interest to corporate Information Technology (IT) administrators today is the replication of end-user email database files (e.g., Microsoft® Outlook® personal folder files with ".pst" extensions). These end-user email database files have grown dramatically in size recently, with each file often being well over 2 gigabytes large. Also, corporations are severely cutting back on server-side email storage. Since the corporate side is too small to include the end-user email database files in a server-side (e.g., Microsoft® Exchange server) backup, an end-user email database file (e.g., a .pst file) is typically the only copy of the email messages. This presents enormous risk and exposure to corporations as important email messages may be lost. What is needed is a method for efficiently backing-up end-user email database files (such as Microsoft® Outlook® pst files or Lotus® Notes ".nsf" extension files).

Thus, there is a need in the art for improved storage of end-user email database files.

SUMMARY OF EMBODIMENTS OF THE INVENTION

Provided are a method, computer program product, and system for transferring data. It is determined whether an indicators map is to be associated with a source file that is being opened, wherein the indicators map indicates which source blocks of the source file have been updated since last being transferred to a target file. In response to determining that an indicators map is to be associated with the source file, it is determined whether the indicators map exists. In response to determining that the indicators map exists, it is determined whether the indicators map is to be trusted based on a last modified time and a last source file size stored in the indicators map and the source file. In response to determining that the indicators map is to be trusted, the indicators map is initialized. Then, in response to receiving a write for the source file, the indicators map is updated to indicate which portion of the source file has been modified.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
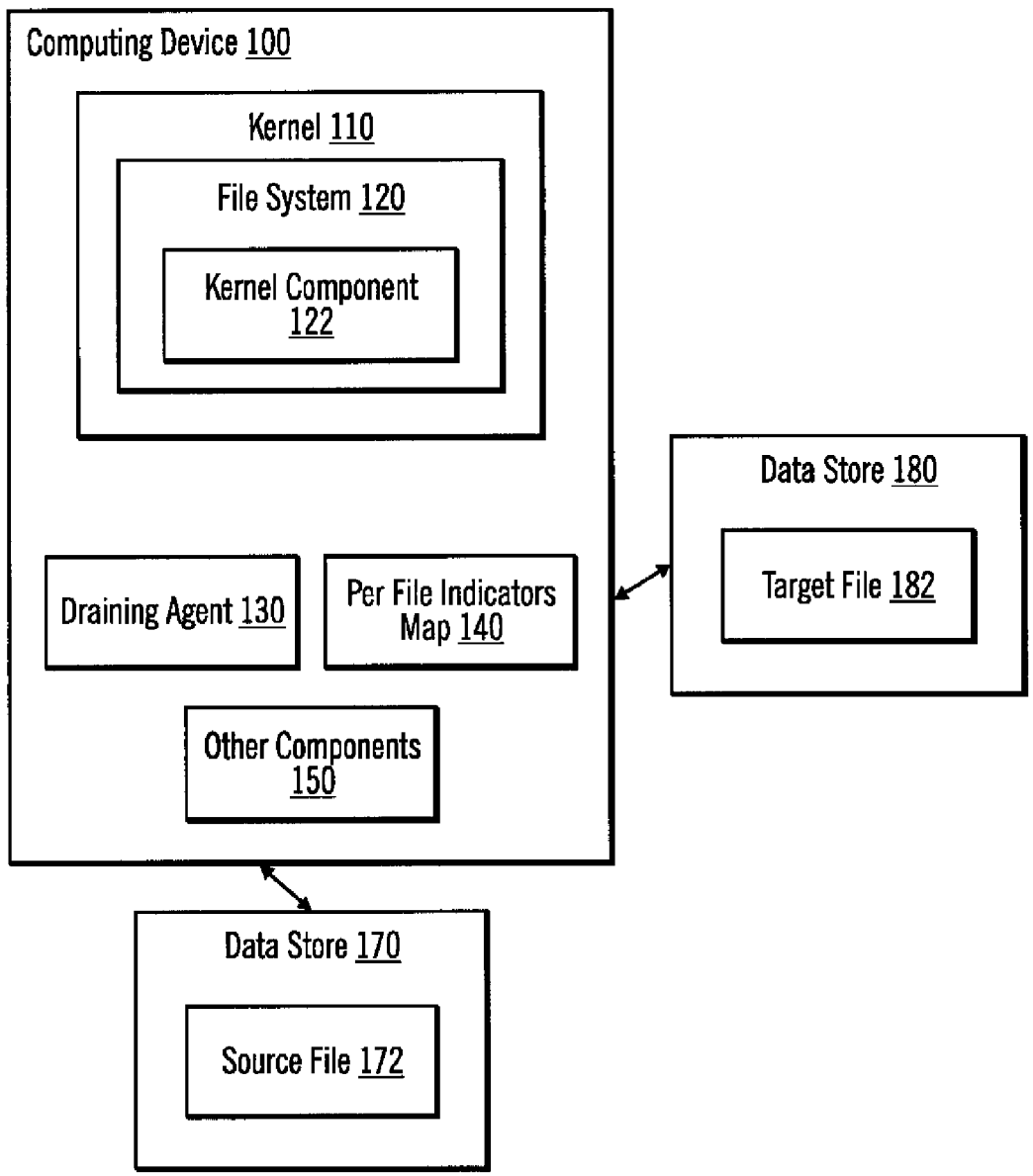
FIG. 1 illustrates details of a computing device in accordance with certain embodiments.

FIG. 1 illustrates details of a computing device 100 in accordance with certain embodiments. The computing device 100 includes a kernel 110, a draining agent 130, an indicators map 140 for each file, and may include other components 150. The indicators map 140 includes an indicator (e.g., a bit) for each portion of a file (e.g., a block), and, when that portion of the file is changed, the indicator is set to indicate such a change.

The kernel 110 includes a file system 120, which includes a kernel component 122 that intercepts file system traffic and maintains the indicators map 140. The kernel component 122 may be described as a portable layer of the file system 120 that universally intercepts file system I/O operations on any file system or platform in a way suitable to provide indicators map services on a per-file basis.

The computing device 100 is coupled to a data store 170, which includes a source file 172. The computing device is also coupled to another data store 180, which includes a target file 182. The target file is a copy of the source file 172. The indicators map 140 includes indicators that indicate which blocks of the source file have been modified since the source blocks were last copied to the target file 182. The file system 120 manages access (i.e., reads and writes) of the source file 172 and the target file 182. The draining agent 130 is responsible for processing the indicators map 140 and distributing the actual changed source data from the source file 172 to the target file 182.

The computing device 100 may comprise any computing device known in the art, such as a server, mainframe, workstation, personal computer, hand held computer, laptop telephony device, network appliance, etc.

The computing device 100 may be coupled to data stores 170, 180 via any type of communication path (e.g., a peer-to-peer network, spoke and hub network, Storage Area Network (SAN), a Local Area Network (LAN), Wide Area Network (WAN), the Internet, an Intranet, etc.)

Each data store 170, 180 may comprise, for example, an array of storage devices, such as Direct Access Storage Devices (DASDs), Just a Bunch of Disks (JBOD), Redundant Array of Independent Disks (RAID), virtualization device, etc.

In certain embodiments, the kernel component 122 intercepts all file system traffic (e.g., opening of files, writes to files, etc.). The kernel component 122 keeps track of file blocks that have changed by use of the indicators map 140 representing the entire file. File Input/Output (I/O) can occur in a variety of sophisticated mechanisms, including regular user-initiated I/O, kernel paging I/O, user-initiated paging I/O, and by-products of other kernel-only operations. The context in which an I/O occurs may be very limited and not allow for any sort of extensive processing (e.g., in an interrupt or elevated Interrupt Processor Level (IPL)). Thus, embodiments in which the indicators map 140 is a bitmap, the kernel component 122 does bit-type operations, with the minimal support from an operating system (not shown) for locking or synchronization. Even imaging the indicators map 140 out to a persistent store, such as a file, is not easily accomplished by the kernel component 122 at the time of an I/O occurring.

Ultimately, whatever source blocks are changed need to be moved to a target location. The draining agent 130 is responsible for processing the indicators map 140 for a file to move the changed source blocks of the source file 172 to the target file 182. In certain embodiments, the draining agent 130 performs the processing of the indicators map 140 because a current application doing the source file alteration (i.e., writes) may not be assured of having ample security, bandwidth, or an operating system environment suitable for performing additional I/O operations (e.g., the transfer/copying of data). Furthermore, it is possible that the current application performing the alteration is not even running at the later time when replication/backup occurs.

Embodiments provide synchronization between the kernel component 122 and the draining agent 130.

Figure 2A:
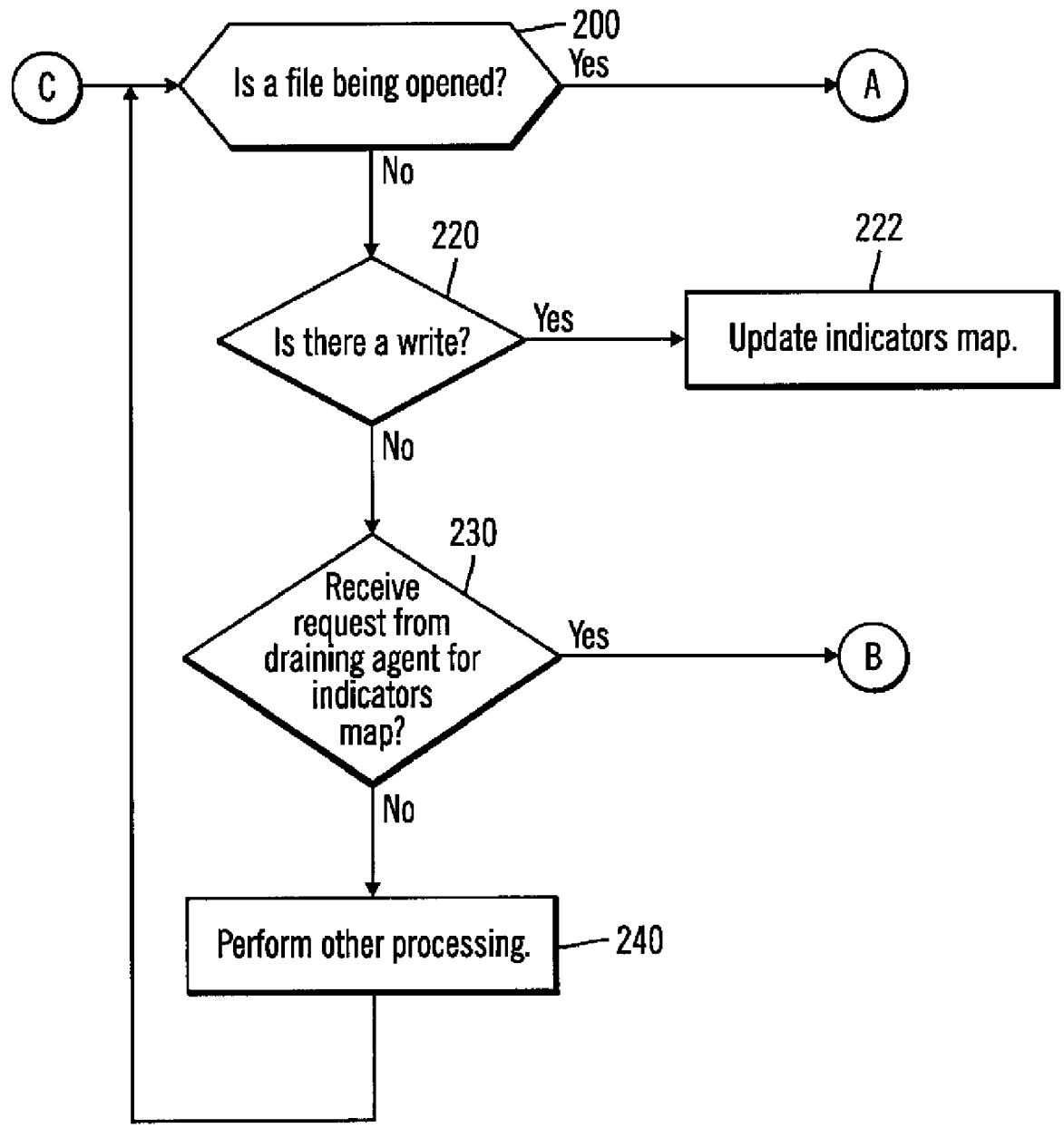
FIGS. 2A, 2B, and 2C illustrate logic performed by a kernel component in accordance with certain embodiments.
Figure 2B:
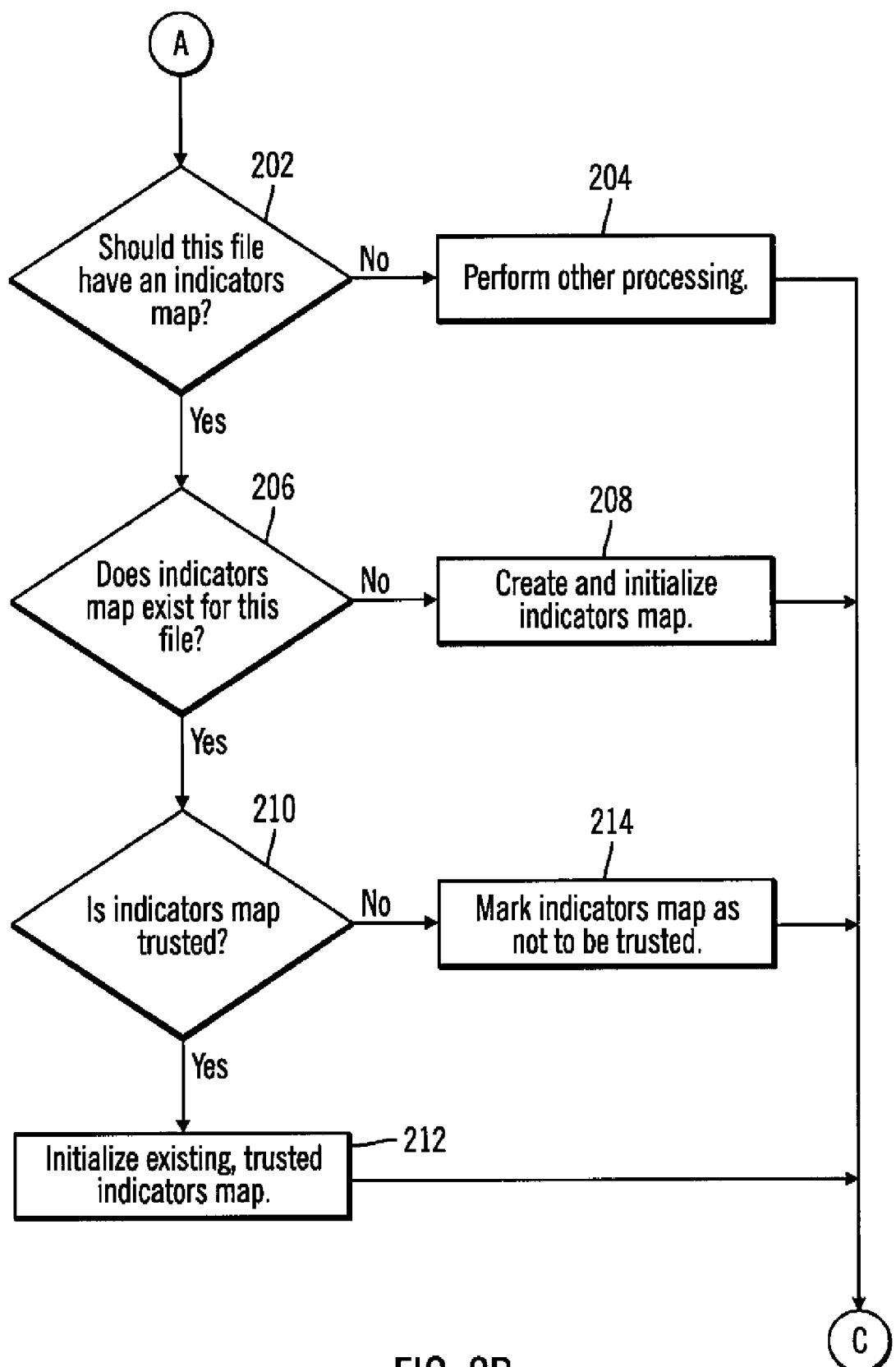
Figure 2C:
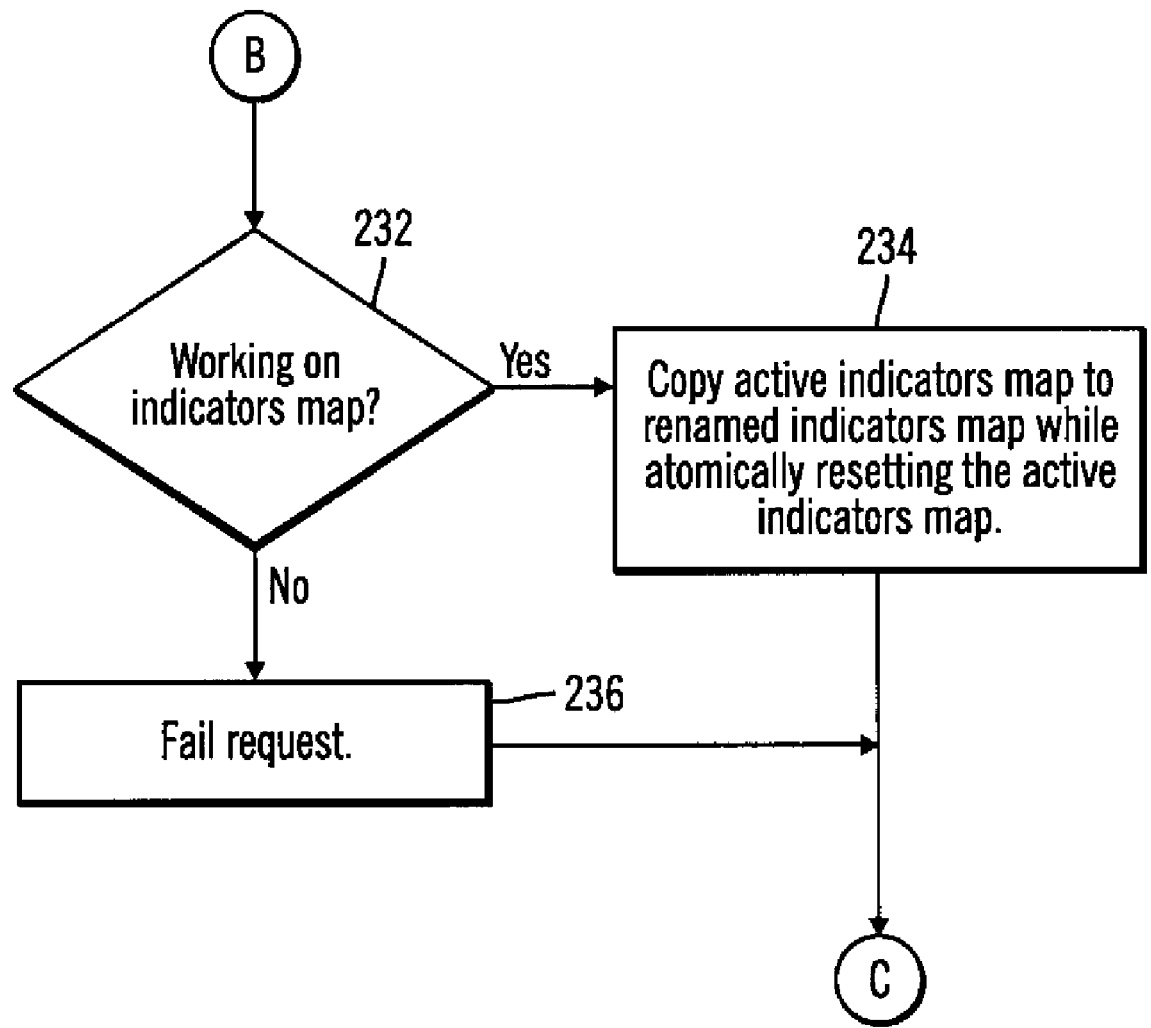

FIGS. 2A, 2B, and 2C illustrate logic performed by the kernel 110 in accordance with certain embodiments. Logic begins at block 200 with the kernel component 220 determining whether a file is being opened. That is, the kernel component 220 intercepts file system traffic and determines whether that file system traffic is to open a file. If so, processing continues to block 202 (FIG. 2B), otherwise, processing continues to block 220.

In block 220, the kernel component 122 determines whether there is a write. That is, the kernel component 220 intercepts file system traffic and determines whether that file system traffic is to write data to the source file 172. If so, processing continues to block 222, otherwise, processing continues to block 230. In block 230, the kernel component 122 determines whether a request for an indicators map has been received from the draining agent 130. If so, processing continues to block 232 (FIG. 2C), otherwise, processing continues to block 240. In block 240, the kernel component performs other processing. From block 240, processing loops back to block 200.

In FIG. 2B, at block 202, the kernel component 122 determines whether the file being opened should have an indicators map. If so, processing continues to block 206, otherwise, processing continues to block 204. In block 204, the kernel component 122 performs other processing. From block 204, processing loops back to block 200 (FIG. 2A).

That is, embodiments automatically detect suitability of creating an indicators map 140 for a file at file-open time using semantics. The suitability is based one or more factors, such as, whether the file being opened meets a configurable minimum size threshold, whether the file being opened is an existing file (i.e., being opened for "existing and interior writes", which may be described as writes that are within the boundaries of a file rather than those that extend the file) as opposed to opening a new file, and whether the file being opened is experiencing interior writes as opposed to experiencing no I/O and merely being held open/locked as a synchronization technique of multiple applications opening the same file.

In block 206, the kernel component 122 determines whether an indicators map exists for this file. If so, processing continues to block 210, otherwise, processing continues to block 208. In block 208, the kernel component 122 creates and initializes an indicators map 140 for the file being opened. From block 208, processing loops back to block 200 (FIG. 2A).

In block 210, the kernel component 122 determines whether the indicators map may be trusted. In certain embodiments, the kernel component 122 stores a last modified time (i.e., a last time a write was applied) and a last file size value of the source file 172 each time a write occurs in the header of the indicators map 140. In such embodiments, the kernel component 122 determines the trustworthiness of the indicators map 140 by examining the recorded last modified time and last file size value stored in the header of the indicators map 140 against the same values of the source file. If the values match, the kernel component 122 determines that the indicators map 140 may be trusted and used. If the indicators map may be trusted, processing continues to block 212, otherwise, processing continues to block 214. In block 212, the kernel component 122 initializes the existing, trusted indicators map. From block 212, processing loops back to block 200 (FIG. 2A).

To correctly deal with restart conditions (e.g., machine failures, reboots, power-loss, etc.), the kernel component 122 may use an indicators map 140 that existed prior to the restart condition, and this indicators map 140 may later be used by the draining agent 130 to avoid transferring the full source copy when only portions have changed.

In block 214, the kernel component 122 marks the indicators map 140 as "not to be trusted". In certain embodiments, if the indicators map 140 is marked as "not to be trusted", the draining agent 130 makes a complete copy of the source file and the indicators map 140 is discarded (either before or after the copy is made). From block 214, processing loops back to block 200 (FIG. 2A).

In certain embodiments, if the indicators map 140 can not be trusted, the indicators map 140 is not discarded, as this would "forget" any changed blocks already recorded.

In FIG. 2C, at block 232, the kernel component 122 determines whether it is working on the indicators map 140 (i.e., the indicators map 140 is in use). If so, processing continues to block 234, otherwise, processing continues to block 236. In block 234, the kernel component 122 copies the active indicators map to a renamed indicators map while atomically resetting the active indicators map that is currently accumulating changes. In certain embodiments, this processing occurs using a semaphore that requires multiple independent threads to synchronize an operation. From block 234, processing loops back to block 200 (FIG. 2A).

In block 236, the kernel component 236 fails the request. From block 236, processing loops back to block 200 (FIG. 2A).

Figure 3:
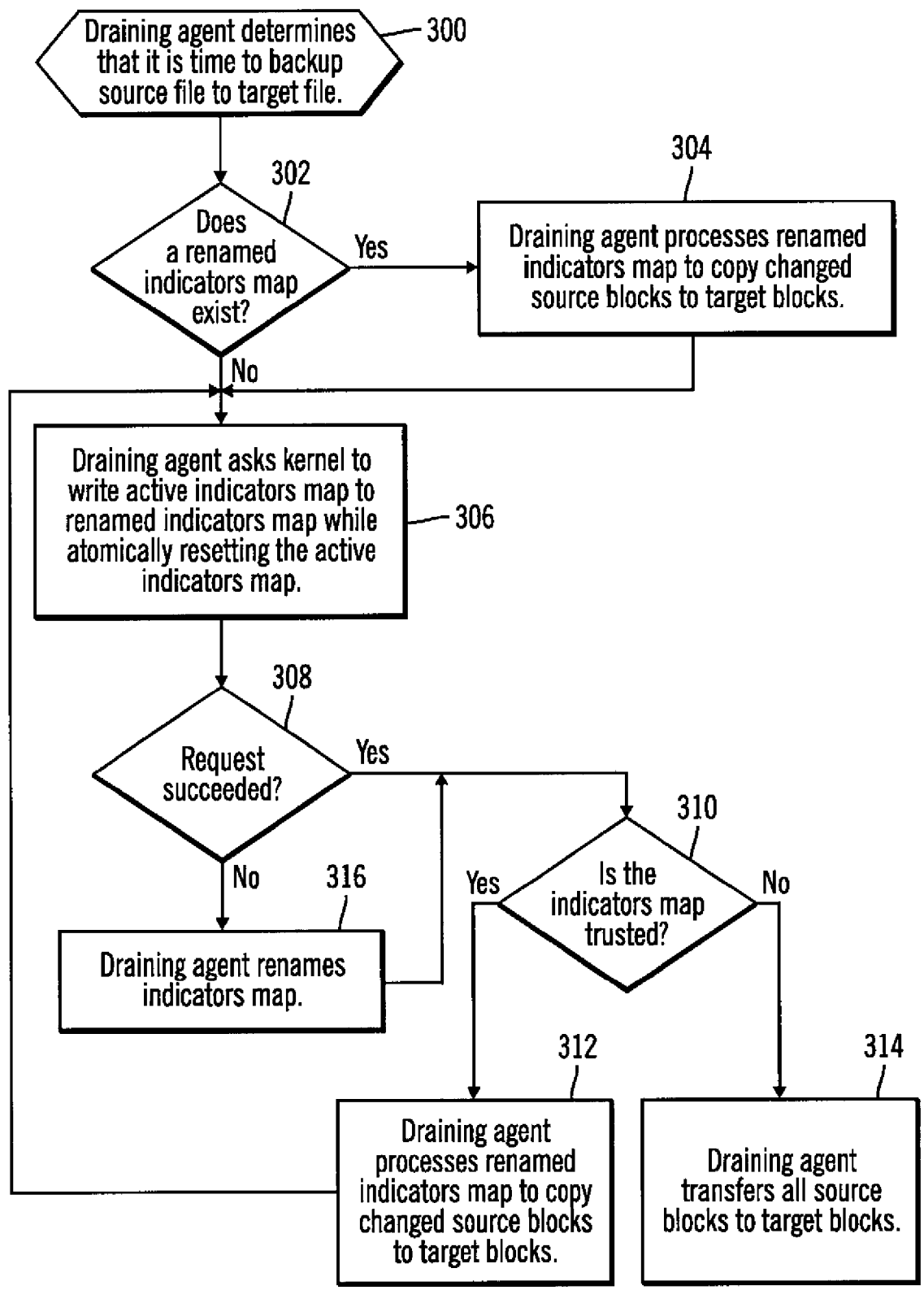
FIG. 3 illustrates logic performed by a draining agent in accordance with certain embodiments.

FIG. 3 illustrates logic performed by the draining agent 130 in accordance with certain embodiments. Control begins at block 300 with the draining agent 130 determining that it is time to backup a source file 172 to a target file 182. The determination may be made based, for example, on a time period (e.g., backup occurs every 24 hours) or an event (e.g., a file is being closed).

In block 302, the draining agent 130 determines whether a renamed indicators map exists for the source file 172. That is, in case this is a restart condition (e.g., due to machine failures, reboots, power-loss, etc.), the draining agent 130 looks for a renamed indicators map to avoid transferring the full base source copy again.

If so, processing continues to block 304, otherwise, processing continues to block 306. In block 304, the draining agent 130 processes the renamed indicators map to copy changed source blocks to target blocks. In certain embodiments, the draining agent does not determine the trustworthiness of the existing renamed indicator map because it is presumed that was done prior to the indicators map becoming the active copy. In certain embodiments, at the completion of copying the changed source blocks to target blocks, the draining agent 130 sets a last modified time and a last file size in the target file, and this information may then be validated against any newly accumulating indicators map 140 that may be processed next. In certain embodiments, the active indicator map that is currently accumulating changes is not processed directly by the draining agent 130, rather, the active indicators map is atomically renamed to an in-process name. From block 304, processing continues to block 306 as a new indicators map may have been created while the draining agent 140 was copying source blocks to target blocks.

In block 306, the draining agent 130 asks the kernel component 122 to copy the active indicators map to a renamed indicators map while atomically resetting the active indicators map that is currently accumulating changes. In certain embodiments, the draining agent 130 asks the kernel to write-out the accumulated indicators map 140 to a new file while atomically resetting the currently accumulating indicators map 140. The draining agent 130 then processes the renamed indicators map 140 against a snapshot view of the source file at some time (i.e., either immediately or at a later time). A snapshot view may be described as a copy of data at a certain point in time.

In block 308, the draining agent 130 determines whether the request succeeded (i.e., whether the kernel component 122 responded to the request to indicate that the request succeeded (i.e., a renamed indicators map was created) or failed). If the request succeeded, processing continues to block 310, otherwise, processing continues to block 316.

In block 310, the draining agent 130 determines whether the indicators map may be trusted. If so, processing continues to block 312, otherwise, processing continues to block 314.

The draining agent 130 determines whether a given indicators map 140 may be trusted and rendered into the prior copy of the target file. Embodiments provide a technique for knowing the trustworthiness of the indicators map 140. In certain embodiments, a special set of attributes exists in the header of the indicators map that allows the draining agent 130 to know whether a particular indicators map may be trusted against the target file that is about to receive data. In certain embodiments, a last modified time and a last file size are recorded in the indicators map at the instant that the indicators map 140 is created by the kernel component 122. The draining agent may then test those values against the last modified time and last file size stored in the target file to ensure they are of the same base heritage. Furthermore, values for the last modified time and last file size of the most recent and final writes to the source file are recorded in the indicators map so that the draining agent 130 may apply those attributes to the target file (i.e., store these attributes in the target file) (which then ensures the loop of checking the trustworthiness of the indicator map can continue for a subsequent sequence).

Thus, embodiments provide a portable technique of describing indicators maps 130 and ancillary information. In certain embodiments, the indicators map 140 may be a file that itself is self-describing using a unique combination of an Extensible Markup Language (XML) header (whose size is self-disclosed) along with an indexable binary bitmap data. The header encodes information that allows the draining agent 130 to correctly match the indicators map 140 against a target file, as well as describing attributes of the indicators map 140 file (such as its blocking factor (i.e., size of a block)). To save on space on sparcely-written files, the XML header may articulate independent regions of the changed file areas that are individually indexable. That is, an index may be used to identify portions of the indicators map that have been modified.

In block 312, the draining agent 130 processes the renamed indicators map to copy changed source blocks to target blocks. From block 312, processing loops back to block 306 to obtain a current copy of the active indicators map 140, as this active indicators map 140 may have new indicators that were set while the draining agent 130 was processing the copy of the previous active indicator map. In block 314, the draining agent transfers all source blocks to target blocks.

At block 316, the draining agent 130 has received an indication from the kernel component 122 that the request failed, and the draining agent 130 renames the indicators map. Then, if the kernel component 122 looks for this indicators map, the kernel component 122 will not find it and will create a new indicators map. From block 316, processing continues to block 310.

Embodiments offer per-file granularity, as opposed to volume level solutions. Thus, embodiments may be applied to files of interest versus an entire file system or volume. For example, indicators maps may be maintained for files of interest versus for all files in a file system or volume.

Embodiments provide a technique for achieving coherency with a draining agent 130. The draining agent 130 has a coherent view of the indicators map 140 and an ability to simultaneously tell the kernel component 122 to "start afresh". This is done by the draining agent 130 calling into the kernel component 122 and having the kernel component 122 create a renamed indicators map if the kernel component 122 currently has the source file in-process and/or opened or by having the draining agent 130 atomically rename the indicators map 140 if the kernel component 122 does not have the source file in-process and/or opened. The draining agent 130 asks the kernel to write the accumulated indicator map 140 to a specific file and start a fresh indicator map or else return an error if the indicator map was not in-process (i.e., not being used by the kernel component 122).

Embodiments provide a restartable technique. Computers reboot unexpectedly and/or applications shutdown abnormally at times. Also, a file could be mid-way replicating when for some reason the replication is stopped (e.g., due to network conditions, reboot, log-out, system crash, etc). Embodiments enable restarting both the kernel component 122 accumulation of any indicators map 140 as well as the draining agent 130 transfer of source blocks without the risk of any data loss nor the need to fully move the source file 172 to the target file 182 in its entirety. To accomplish this, a variety of checks are made. First, when the kernel component 122 opens a source file, the kernel component first checks to see whether there is an indicators map 140 file already present. If so, the kernel component 122 then determines the trustworthiness of the indicators map 140. If the indicators map may be trusted, this indicators map is used. Similarly, the draining agent 130 is started periodically. The draining agent 130 works on a copy of the prior accumulating indicators map 140. When draining agent 130 starts a new replication operation, the draining agent 130 checks whether there is already a copy of an indicators map 140 in existence (i.e., one created from a hard stop that did not allow for proper completion and removal of the indicators map). If the indicators map 140 exists, the draining agent 130 processes that indicators map 140 first.

Thus, embodiments allow for the creation of a per-file indicators map 140, which may be a file in certain embodiments, that describes the changed areas of the source file. Embodiments are platform and file system independent. Embodiments also compliment snapshot technology to offer coherence when replicating.

Embodiments provide a technique to know the trustworthiness of the indicators map 140. Embodiments achieve coherency with the draining agent 130. Embodiments address restarting of systems. Embodiments automatically determine whether using an indicators map 140 is suitable for a particular file based, for example, on file operations.

Lotus is a registered trademark or common law mark of International Business Machines Corporation in the United States and/or other countries. Microsoft and Outlook are registered trademarks or common law marks of Microsoft Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2A, 2B, 2C, and 3 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2A, 2B, 2C, and 3 may be implemented in software, hardware, programmable and non-programmable gate array logic or in some combination of hardware, software, or gate array logic.

Figure 4:
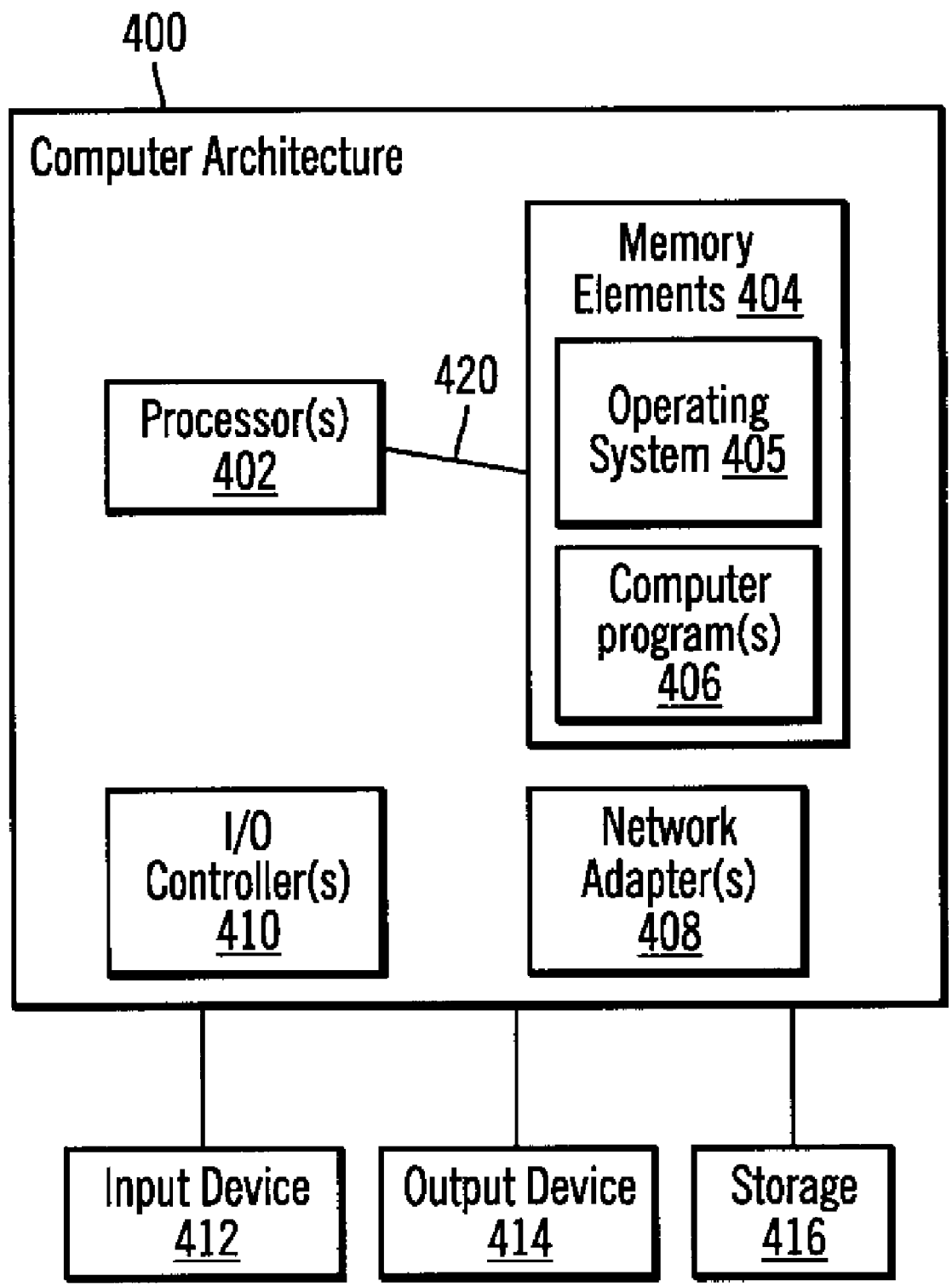
FIG. 4 illustrates a system architecture that may be used in accordance with certain embodiments.

FIG. 4 illustrates a system architecture 400 that may be used in accordance with certain embodiments. Client computer 100 may implement system architecture 400. The system architecture 400 is suitable for storing and/or executing program code and includes at least one processor 402 coupled directly or indirectly to memory elements 404 through a system bus 420. The memory elements 404 may include local memory employed during actual execution of the program code, bulk storage, and cache memories which provide temporary storage of at least some program code in order to reduce the number of times code must be retrieved from bulk storage during execution. The memory elements 404 include an operating system 405 and one or more computer programs 406.

Input/Output (I/O) devices 412, 414 (including but not limited to keyboards, displays, pointing devices, etc.) may be coupled to the system either directly or through intervening I/O controllers 410.

Network adapters 408 may also be coupled to the system to enable the data processing system to become coupled to other data processing systems or remote printers or storage devices through intervening private or public networks. Modems, cable modem and Ethernet cards are just a few of the currently available types of network adapters 408.

The system architecture 400 may be coupled to storage 416 (e.g., a non-volatile storage area, such as magnetic disk drives, optical disk drives, a tape drive, etc.). The storage 416 may comprise an internal storage device or an attached or network accessible storage. Computer programs 406 in storage 416 may be loaded into the memory elements 404 and executed by a processor 402 in a manner known in the art.

The system architecture 400 may include fewer components than illustrated, additional components not illustrated herein, or some combination of the components illustrated and additional components. The system architecture 400 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for transferring data, comprising:
   under control of a kernel component,
      in response to determining that a source file is being opened,
         determining whether an indicators map is to be created for the source file, wherein the indicators map indicates which source blocks of the source file have been updated since last being transferred to a target file;
         in response to determining that an indicators map is to be created for the source file, determining whether the indicators map exists;
         in response to determining that the indicators map exists, determining whether the indicators map is to be trusted by comparing a last modified time and a last source file size stored in the indicators map and the last modified time and the last source file size of the source file; and
      in response to determining that the last modified time and the last source file size stored in the indicators map matches the last modified time and the last source file size of the source file, initializing the indicators map;
      in response to receiving a request for the indicators map from a draining agent,
         in response to determining that the indicators map is in use by the kernel component, copying the indicators map to a renamed indicators map while atomically resetting the indicators map; and
         in response to determining that the indicators map is not in use by the kernel component, failing the request from the draining agent; and
   under control of the draining agent,
      in response to determining that the renamed indicators map exists, using the renamed indicators map to copy source blocks from the source file to target blocks of the target file; and
      in response to determining that the renamed indicators map does not exist,
         requesting that the kernel component copy the indicators map to the renamed indicators map while atomically resetting the indicators map; and
         in response to determining that the request was failed, renaming the indicators map to cause the kernel component to create a new indicators map.

2. The method of claim 1, further comprising:
   determining that the source file is being opened by intercepting file system Input/Output (I/O) operations.

3. The method of claim 1, further comprising:
   in response to determining that the indicators map is not to be trusted, creating a new indicators map.

4. The method of claim 1, wherein the indicators map includes an Extensible Markup Language (XML) header.

5. The method of claim 1, further comprising:
   receiving the request for the indicators map for the source file.

6. The method of claim 1, further comprising:
   after a restart condition, in response to determining that it is time to backup up the source file to a target file;
      determining that the renamed indicators map exists that existed prior to the restart condition; and
      using the renamed indicators map to copy the source blocks from the source file to the target blocks of the target file using the renamed indicators map.

7. The method of claim 5, further comprising:
   determining whether the renamed indicators map is to be trusted by checking the last modified time and the last file size stored in the indicators map against a last modified time and a last file size stored in the target file; and
   in response to determining that the renamed indicators map is to be trusted, using the renamed indicators map to copy source blocks from the source file to target blocks of the target file.

8. A computer program product comprising a computer readable storage medium storing a computer readable program, wherein the computer readable program when executed by a processor on a computer causes the computer to:
   under control of a kernel component,
      in response to determining that a source file is being opened,
         determine whether an indicators map is to be created for the source file, wherein the indicators map indicates which source blocks of the source file have been updated since last being transferred to a target file;
         in response to determining that an indicators map is to be created for the source file, determine whether the indicators map exists;
         in response to determining that the indicators map exists, determine whether the indicators map is to be trusted by comparing a last modified time and a last source file size stored in the indicators map and the last modified time and the last source file size of the source file; and
         in response to determining that the last modified time and the last source file size stored in the indicators map matches the last modified time and the last source file size of the source file, initialize the indicators map;
      in response to receiving a request for the indicators map from a draining agent,
         in response to determining that the indicators map is in use by the kernel component, copy the indicators map to a renamed indicators map while atomically resetting the indicators map; and
         in response to determining that the indicators map is not in use by the kernel component, fail the request from the draining agent; and
   under control of the draining agent,
      in response to determining that the renamed indicators map exists, use the renamed indicators map to copy source blocks from the source file to target blocks of the target file; and in response to determining that the renamed indicators map does not exist,
request that the kernel component copy the indicators map to the renamed indicators map while atomically resetting the indicators map; and
in response to determining that the request was failed, rename the indicators map to cause the kernel component to create a new indicators map.

9. The computer program product of claim 8, wherein the computer readable program when executed on a computer causes the computer to:
determine that the source file is being opened by intercepting file system Input/Output (I/O) operations.

10. The computer program product of claim 8, wherein the computer readable program when executed on a computer causes the computer to:
in response to determining that the indicators map is not to be trusted, create a new indicators map.

11. The computer program product of claim 8, wherein the indicators map includes an Extensible Markup Language (XML) header.

12. The computer program product of claim 8, wherein the computer readable program when executed on a computer causes the computer to:
receive the request for the indicators map for the source file.

13. The computer program product of claim 12, wherein the computer readable program when executed on a computer causes the computer to:
determine whether the renamed indicators map is to be trusted by checking the last modified time and the last file size stored in the indicators map against a last modified time and a last file size stored in the target file; and
in response to determining that the renamed indicators map is to be trusted, use the renamed indicators map to copy source blocks from the source file to target blocks of the target file.

14. The computer program product of claim 8, wherein the computer readable program when executed on a computer causes the computer to:
after a restart condition, in response to determining that it is time to backup up the source file to a target file;
determine that the renamed indicators map exists that existed prior to the restart condition; and
use the renamed indicators map to copy the source blocks from the source file to the target blocks of the target file using the renamed indicators map.

15. A system for transferring data, comprising:
hardware logic performing operations, the operations comprising:
under control of a kernel component,
in response to determining that a source file is being opened,
determining whether an indicators map is to be created for the source file, wherein the indicators map indicates which source blocks of the source file have been updated since last being transferred to a target file;
in response to determining that an indicators map is to be created for the source file, determining whether the indicators map exists;
in response to determining that the indicators map exists, determining whether the indicators map is to be trusted by comparing a last modified time and a last source file size stored in the indicators map and the last modified time and the last source file size of the source file;
in response to determining that the last modified time and the last source file size stored in the indicators map matches the last modified time and the last source file size of the source file, initializing the indicators map;
in response to receiving a request for the indicators map from a draining agent,
in response to determining that the indicators map is in use by the kernel component, copying the indicators map to a renamed indicators map while atomically resetting the indicators map; and
in response to determining that the indicators map is not in use by the kernel component, failing the request from the draining agent; and
under control of the draining agent,
in response to determining that the renamed indicators map exists, using the renamed indicators map to copy source blocks from the source file to target blocks of the target file; and
in response to determining that the renamed indicators map does not exist,
requesting that the kernel component copy the indicators map to the renamed indicators map while atomically resetting the indicators map; and
in response to determining that the request was failed, renaming the indicators map to cause the kernel component to create a new indicators map.

16. The system of claim 15, wherein the operations further comprise:
determining that the source file is being opened by intercepting file system Input/Output (I/O) operations.

17. The system of claim 15, further comprising:
in response to determining that the indicators map is not to be trusted, creating a new indicators map.

18. The system of claim 15, wherein the indicators map includes an Extensible Markup Language (XML) header.

19. The system of claim 15, further comprising:
receiving the request for the indicators map for the source file.

20. The system of claim 19, further comprising:
determining whether the renamed indicators map is to be trusted by checking the last modified time and the last file size stored in the indicators map against a last modified time and a last file size stored in the target file; and
in response to determining that the renamed indicators map is to be trusted, using the renamed indicators map to copy source blocks from the source file to target blocks of the target file.

21. The system of claim 15, further comprising:
after a restart condition, in response to determining that it is time to backup up the source file to a target file;
determining that the renamed indicators map exists that existed prior to the restart condition; and
using the renamed indicators map to copy the source blocks from the source file to the target blocks of the target file using the renamed indicators map.

* * * * *